UNITED STATES PATENT OFFICE.

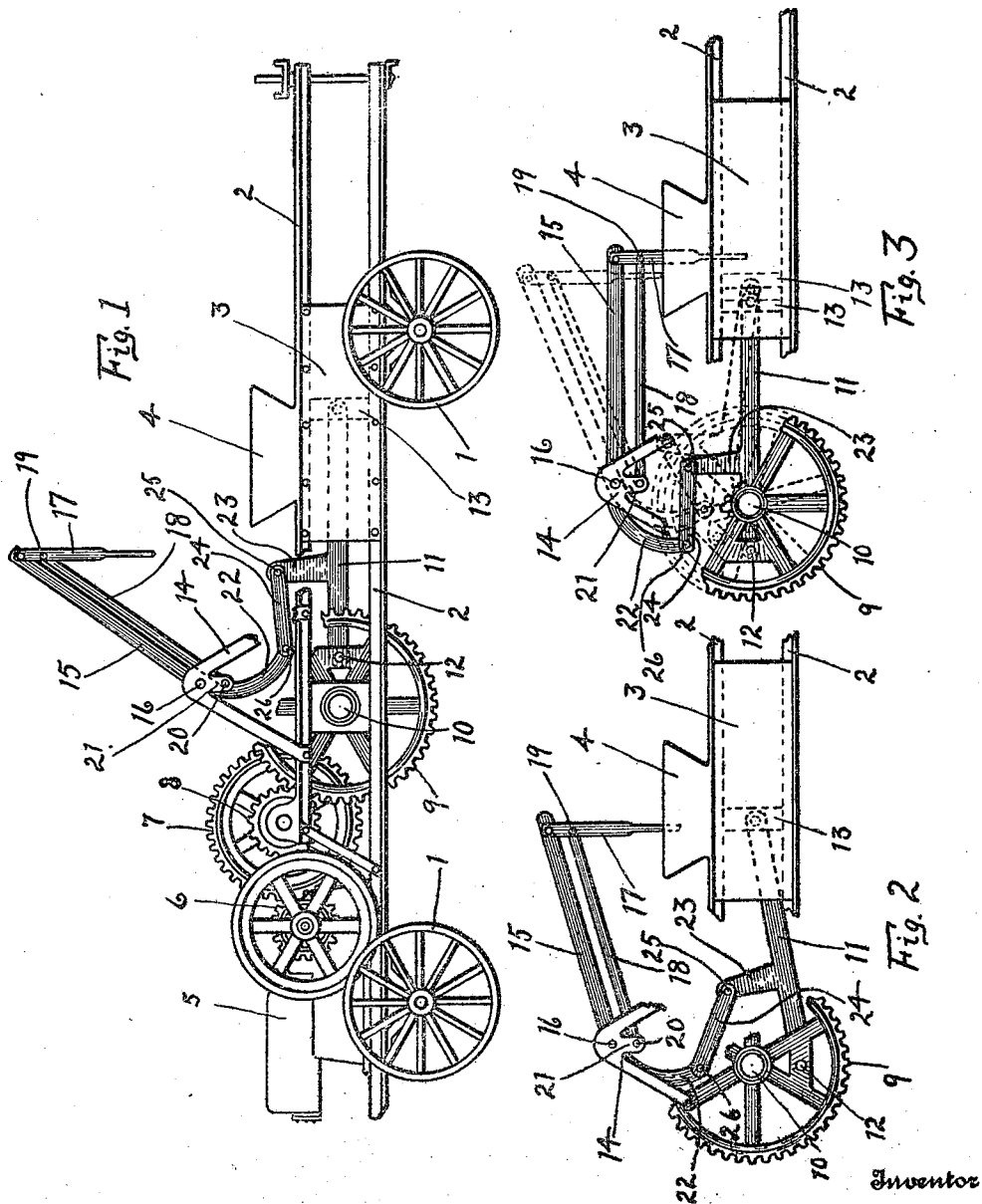

JOHN W. BURKETT, OF COLUMBUS, OHIO, ASSIGNOR TO THE BURKETT MANUFACTURING COMPANY, OF COLUMBUS, OHIO, A CORPORATION OF OHIO.

HAY-PRESS.

1,278,301.  Specification of Letters Patent.  Patented Sept. 10, 1918.

Application filed June 9, 1915. Serial No. 33,180.

*To all whom it may concern:*

Be it known that I, JOHN W. BURKETT, a citizen of the United States, residing at Columbus, in the county of Franklin and State of Ohio, have invented certain new and useful Improvements in Hay-Presses, of which the following is a specification.

My invention relates to hay presses in general and is directed more particularly to the provision of mechanism for imparting the desired movement to the feeder heads of such hay presses. The most desirable movement is one wherein the plunger does not start in its return movement to thereby compress the previously inserted hay against the feeder head, before this feeder head has had time to move out of the bale chamber.

Therefore, the main object of my invention resides in the provision of a structure wherein the feeder head structure may be withdrawn from its operative position within the baling chamber before the plunger or head block has been given a perceptible forward movement or, in other words, has been given such forward movement as would be sufficient to compress the hay to any extent to wedge it against the feeder head blades. My invention also resides in taking the movement that gives the feeder head its fastest travel off of the pitman at such time when the head block is at its slowest travel. In other words, the head block, when actuated by means of an oscillating reciprocating pitman, has its slowest movement at the extreme ends of its stroke and it is at the time when the pitman is at the rear end of its stroke when the feeder head is given its fastest movement and this movement is in a direction in and out of the bale chamber.

A further object of my invention resides in providing a structure wherein the feeder head is pivoted intermediate its ends and wherein a link is provided to be operatively connected between the pitman and the rear end of the pivoted feeder head, this link being in a substantially horizontal position when the feeder head is at the bottom of its stroke or when the pitman passes its rear dead center position. By a substantially horizontal position, I mean such position within reasonable variations when the link lies substantially parallel with the horizontal center line of the bale chamber.

The preferred embodiment of my invention is shown in the accompanying sheet of drawings, in which similar characters of reference designate corresponding parts, and in which:

Figure 1 shows a hay press with my mechanism for imparting movement to the feeder head applied thereto, and, Figs. 2 and 3 are fragmentary views showing the feeder head in its various positions.

In these drawings the running gear is designated generally by the reference numeral 1, this running gear carrying a general framework 2. Toward the rear of the general framework there is formed a bale chamber or cylinder 3 provided with a feed hopper 4 at its upper side, while the forward end of the framework carries an engine 5. This engine 5 forms the power unit by means of which the press as a whole, is driven through the medium of the train of gearing designated 6, 7, 8 and 9. That portion of the gearing designated 9 is preferably composed of twin gears or two gears located side by side, these gears being mounted on stub shafts 10 and eccentrically carrying a pitman 11 between them as is shown at 12. This point of attachment 12 may be described as imparting an eccentric movement to the pitman or its equivalent, a crank movement, whereby the head block or plunger 13 is given a reciprocatory movement in and out of the bale chamber 3. The general framework also carries a pair of spaced bracket supporting members 14 between the upper ends of which the feeder head lever 15 is pivoted intermediate its ends as is shown at 16. This feeder head lever pivotally carries the usual type of blade 17 at its forward end and this blade is given its proper movement by means of a tie rod 18 pivotally connected at its forward end as shown at 19 to the feeder blade and also pivotally connected at its rear end as shown at 20 to a detent 21 carried by each of the brackets 14. As stated, the forward end of the feeder head lever pivotally carries the feeder blade 17 and while its rear end is bent downwardly as shown at 22 to form a depending arm. The pitman 11 is provided with an upstanding bracket member 23 and a link 24 is pivotally connected as shown at 25 to this bracket and at 26 to the depending arm of the feeder head lever. This link forms the medium of connection between the pitman and the feeder head and the bracket 23 and arm 24 are constructed relatively so that the link 24 will be in substantially horizontal position when the feeder head is at the end of its working stroke, as is shown in solid lines in Fig. 3.

As has been previously related, it is desirable to give the feeder head its fastest movement while the plunger or head block is going through its slowest movement at the rear end of its stroke. This slow movement of the plunger must then necessarily take place as the crank pin 12 is passing its rear or dead center position as is shown in solid lines in Fig. 3. A slight upward movement in the direction of the arrow causes an upward movement of the pitman 11 and also the bracket 23. Since this movement is up and toward the bale chamber because of the circular motion of the crank pin, the depending arm 22 on the feeder head must also naturally be pulled toward the bale chamber. This is true where the connecting link has assumed a substantially horizontal position as is indicated in solid lines in Fig. 3, or it may be inclined slightly so that the movement of the pitman will cause a pull on the depending portion of the feeder head lever so as to elevate its forward end. The rapidity with which the feeder blade 17 leaves the bale chamber may be readily seen from the broken line position indicated in Fig. 3. From this figure, it will be seen that this outward movement takes place in approximately one-eighth of the circular path of the crank pin and this one-eighth movement of the crank pin causes only a very slight forward movement of the plunger. The quarter positions of the crank pin are shown in Figs. 1, 2 and 3, in which it will be noted that the feeder blade is completely out of the hopper and bale chamber at both quarter positions and further that this feeder blade enters the bale chamber in approximately the same speed and manner as it is caused to leave as is shown in broken lines in Fig. 3.

From the foreging description, taken in connection with the accompanying drawings, it will be seen that I have provided a comparatively simple motion for hay press feeder heads. The feeder blade is out of the bale chamber for three-quarters of a revolution of the crank pin or more. This is very desirable since it gives room and time to pitch the hay into the hopper 4 and further, the plunger does not move toward the feeder blade to press the previously fed hay onto it.

What I claim, is:

1. In a hay press, a general framework, a bale chamber, a plunger movable back and forth within said chamber, a feeder head pivoted intermediate its ends to said framework, a depending arm on the rear of said feeder head, a pitman connected to said plunger, an upstanding bracket on said pitman, crank means for driving said pitman, and a link connection between the depending arm on said feeder head and the upstanding bracket on said pitman, said depending arm and said bracket being constructed relatively so that said link assumes a substantially horizontal position when the feeder head is at the bottom of its working stroke and the crank end of the pitman passes its rear dead center position.

2. In a hay press, a general framework, a bale chamber, a plunger movable back and forth within said bale chamber, a feeder head pivoted intermediate its ends to said framework, a depending arm on the rear of said feeder head, a pitman connected to said plunger, crank means for driving said pitman, and a link connection between the depending arm on said feeder head and said pitman.

3. In a hay press, a general framework, a bale chamber, a plunger movable back and forth within said chamber, a feeder head pivoted intermediate its ends to said framework, a depending arm on the rear of said feeder head, a pitman connected to said plunger, an upstanding bracket on said pitman, crank means for driving said pitman, and a link connection between the depending arm on said feeder and the upstanding bracket on said pitman.

In testimony whereof I affix my signature in presence of two witnesses.

JOHN W. BURKETT.

Witnesses:
C. B. HARDMAN,
WALTER E. L. BOCK.